United States Patent [19]

Iida

[11] Patent Number: 5,249,867
[45] Date of Patent: Oct. 5, 1993

[54] LINEAR MOTION GUIDE UNIT ASSEMBLY HAVING A MISALIGNMENT ABSORBING MECHANISM

[75] Inventor: Hirotaka Iida, Shizuoka, Japan

[73] Assignee: Nippon Thompson Co., Ltd., Japan

[21] Appl. No.: 880,437

[22] Filed: May 8, 1992

[30] Foreign Application Priority Data

May 10, 1991 [JP] Japan .................. 3-42372[U]

[51] Int. Cl.$^5$ .................. F16C 29/06; F16C 23/00
[52] U.S. Cl. .................. 384/45; 384/54; 384/57
[58] Field of Search .................. 384/10, 7, 43–45, 384/49, 50, 54, 57

[56] References Cited

U.S. PATENT DOCUMENTS

| | | | |
|---|---|---|---|
| 3,272,570 | 9/1966 | Zenk | 384/44 |
| 3,560,061 | 2/1971 | Shaw, Jr. | 384/44 |
| 3,876,264 | 4/1975 | McCloskey | 384/43 |
| 4,120,538 | 10/1978 | Headen | 384/43 |
| 4,637,738 | 1/1987 | Barkley | 384/7 |
| 4,995,734 | 2/1991 | Schroeder | 384/43 X |
| 5,076,714 | 12/1991 | Teramachi | 384/45 |

FOREIGN PATENT DOCUMENTS 53-21058  6/1978  Japan .

*Primary Examiner*—Thomas R. Hannon
*Attorney, Agent, or Firm*—Skjerven, Morrill, MacPherson, Franklin & Friel

[57] ABSTRACT

A linear motion guide unit assembly includes a linear motion guide unit, comprised of a rail, a slider and a plurality of rolling members interposed between the rail and the slider, a base having a first mounting surface to which the rail is fixedly attached, a table having a second mounting surface to which the slider is fixedly attached, and a misalignment absorbing plate or pivotal member interposed at at least one of the interface between the slider and the table and the interface between the base and the rail. With the provision of such a misalignment absorbing plate or pivotal member, an error in alignment between the first and second mounting surfaces can be absorbed automatically when assembled.

14 Claims, 6 Drawing Sheets

LINEAR MOTION GUIDE UNIT ASSEMBLY HAVING A MISALIGNMENT ABSORBING MECHANISM

BACKGROUND OF THE INVENTION

1. Field of the Invention

This invention generally relates to a linear motion guide unit assembly, and, in particular, to a linear motion rolling contact guide unit assembly having a mechanism for absorbing a misalignment, such as a deviation from a parallel arrangement of two opposed surfaces.

2. Description of the Prior Art

An automatic centering flat surface sliding bearing is well known in the art as described in the Japanese Patent Post-exam Pub. No. 53-21058, and it includes a bearing main body having an outer peripheral surface defined by a straight cylindrical surface and a sliding member mounted on the outer peripheral surface of the main body slidably in the circumferential direction. However, this prior art technique can be applied only to a specific flat surface sliding bearing having a specific structure and is not always applicable to a common linear motion guide unit.

On the other hand, among casted articles, in particular casted articles from aluminum, there are those which gradually deform and develop internal distortions with time after casting, though they may be minor. For example, as shown in FIG. 13, in building a relatively large sliding table assembly including a base 40, a table 41 and a pair of linear motion rolling contact guide units 42 and 43 spaced apart from each other over a lateral distance of d, the base 40 is formed with a pair of coplanar lower mounting surfaces 44 and 45 and the table 41 is also formed with a pair of coplanar upper mounting surfaces 46 and 47, and these coplanar lower and upper mounting surfaces 44-45 and 46-47 are set in parallel to each other. A linear motion rolling contact guide unit is well known in the art and it generally includes an elongated rail, a slider slidably mounted on the rail and a plurality of rolling members, such as balls or rollers, interposed between the rail and the slider. Typically, the rail is rectangular in cross section and provided with a pair of inner guide grooves each on each side of the rail. The slider is generally U-shaped in cross section and mounted on the rail in a straddling fashion and the slider is provided with a pair of outer guide grooves, each located opposite to a corresponding one of the pair of inner guide grooves to thereby define a load path section. The guide unit may be either of the infinite motion type or the finite motion type and in the case of the infinite motion type, the slider is provided with a pair of endless circulating paths in which the rolling members are provided to roll therealong endlessly.

However, if the base 40 and the table 41 are left untouched after casting them and machining them to form the lower and upper mounting surfaces 44-45 and 46-47, for example, only the base 40 may be deformed as shown in FIG. 14 to provide a generally convex top surface so that the lower mounting surfaces 44 and 45 come to be inclined in the opposite directions with respect to the horizonal plane. As a result, the lower mounting surfaces 44 and 45 are not coplanar any more and they are not in parallel with the upper mounting surfaces 46 and 47, even if they may remain coplanar from each other.

Under the condition, if a rail 48 of the linear motion guide unit 42 is fixedly attached to the lower mounting surface 44 and similarly a rail 49 of the linear motion guide unit 43 is fixedly attached to the other lower mounting surface 45, a wedge-shaped gap 52 will be created between a slider 50 of the linear motion guide unit 42 and the upper mounting surface 46 and similarly another wedge-shaped gap 53 will be created between a slider 51 of the other linear motion guide unit 43 and the other upper mounting surface 53.

The base 40 may be deformed to present a concave top surface in which case similar wedge-shaped gaps will be created but in the opposite directions than shown in FIG. 14. Besides, there may be a case in which only the table 41 is deformed, or both of the base 40 and the table 41 are deformed. In each of these cases, a wedge-shaped gap of the kind described above and shown in FIG. 14 will be created, though a particular shape and its size may differ depending on the various conditions. In order to cope with this situation, it is conceivable to prepare a wedge-shaped shim plate to plug such a wedge-shaped gap; however, since the particular shape and size differs one from another, it is not possible to prepare appropriate shim plates in advance. Thus, it is not a viable technique to cope with the situation. Another possible approach would be to machine the mounting surfaces again, but such a reprocessing would be extremely time-consuming and it could be a source for pushing up the cost.

SUMMARY OF THE INVENTION

In accordance with the present invention, there is provided a linear motion guide unit assembly comprising: a linear motion guide unit, including a rail, a slider and a plurality of rolling members interposed between the rail and the slider; a base to which the rail is fixedly attached; a table to which the slider is fixedly attached; and a misalignment absorbing means interposed between the table and the slider and/or between the base and the rail. When the misalignment absorbing means is provided, fixing means must be provided at least at two points spaced apart from each other in a transverse direction normal to the longitudinal axis of the linear motion guide unit.

In one embodiment, the misalignment absorbing means include a resilient or elastic plate which is sandwiched between the table and the slider and/or between the base and the rail. In another embodiment, the misalignment absorbing means includes a pivotal member which is pivotally supported on the slider. The pivotal member is pivotal around a pivotal axis defined at the slider extending in parallel with the longitudinal axis of the linear motion guide unit. And, the pivotal member is fixedly attached to the table so that the lateral inclination of a mounting surface of the base relative to a mounting surface of the table may be absorbed. Therefore, no particular problem arises even if there is a misalignment between mounting surfaces of the table and the base. In addition, since the misalignment is automatically absorbed during the manufacturing process, no additional steps are required.

It is therefore a primary object of the present invention to obviate the disadvantages of the prior art as described above and to provide an improved linear motion guide unit assembly.

Another object of the present invention is to provide an improved linear motion guide unit assembly high in performance and particularly suitable for use in high load applications.

A further object of the present invention is to provide an improved linear motion guide unit assembly capable of absorbing a misalignment between a base and a table between which a linear motion guide unit is assembled.

Other objects, advantages and novel features of the present invention will become apparent from the following detailed description of the invention when considered in conjunction with the accompanying drawings.

DESCRIPTION OF THE PREFERRED EMBODIMENTS

Figure 1:
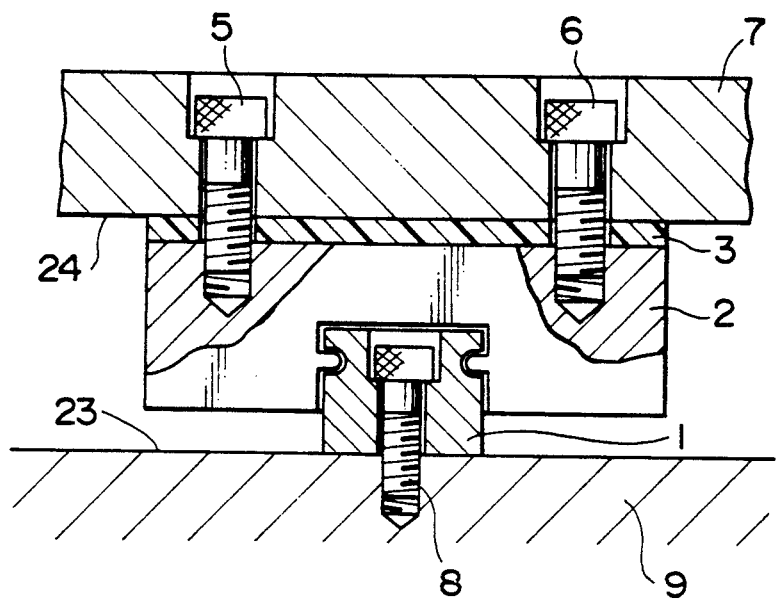
FIG. 1 is a schematic illustration showing partially in transverse cross section a linear motion guide unit assembly constructed in accordance with one embodiment of the present invention.

Referring now to FIG. 1, there is schematically shown a linear motion guide unit assembly constructed in accordance with one embodiment of the present invention. As shown, the present assembly generally includes an elongated rail 1, a slider 2 slidably mounted on the rail 1, a plurality of rolling members (not shown) interposed between the rail 1 and the slider 2, a table 7 to which the slider 2 is fixedly attached by means of bolts 5 and 6, and a base 9 on which the rail 1 is fixedly attached by means of bolts 8.

As well known in the art, the rail 1, slider 2 and the rolling members interposed therebetween define a well-known linear motion guide unit. That is, the rail 1 has a generally rectangular cross section and is provided with a pair of inner guide grooves, one on each side thereof, extending in parallel with the longitudinal axis of rail 1. In the embodiment shown in FIG. 1, each of these inner guide grooves has a circular cross section. The slider 2 has a generally U-shaped cross section, including a horizontal section and a pair of vertical sections depending from the opposite sides of the horizonal section. Each of the vertical sections has an outer guide groove formed at its inner side surface in alignment with an associated inner guide groove to thereby define a load path section in which the rolling members or balls in this embodiment are partly received by both of the inner and outer guide grooves to provide a rolling contact between the rail 1 and the slider 2.

In the case of an infinite type linear motion guide unit, as well known in the art, the slider 2 is provided with a pair of endless circulating paths, each including a load path section, a return path section and a pair of curved connecting path sections, connecting the corresponding ends of the load and return path sections. In this case, the rolling members or balls in this embodiment roll along the endless circulating path indefinitely so that theoretically speaking an infinite relative motion may be provided between the rail 1 and the slider 2. Thus, the rail 1 extends straight in a direction normal to the plane of the drawing and the slider 2 may move along the rail 1 as long as the rail 1 extends.

In the illustrated embodiment, the rail 1 is fixedly attached to the base 9 directly by means of bolts 8. It should be understood that such bolts 8 are generally provided more than one along the longitudinal axis of the rail 1 at a predetermined pitch. On the other hand, the slider 2 is fixedly attached to the table 7 by means of bolts 5 and 6 with an elastic or resilient plate 3 as a misalignment absorbing means sandwiched therebetween. The plate 3 is elastically or resiliently deformable in its thickness direction and it may be comprised of various materials and elements, such as a metal, rubber, plastic and springs. The bolts 5 are provided more than one, but they are located to the left with respect to the longitudinal axis of the rail 1 and the bolts 6 are also provided more than one as located to the right with respect to the longitudinal axis of the rail 1.

Figure 13:
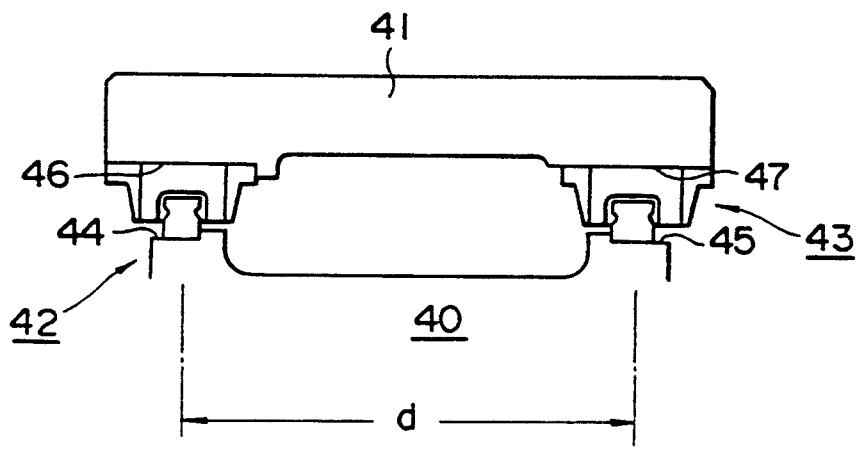
FIG. 13 is a schematic illustration showing in front view a prior art sliding table assembly including a pair of linear motion guide units.
Figure 14:
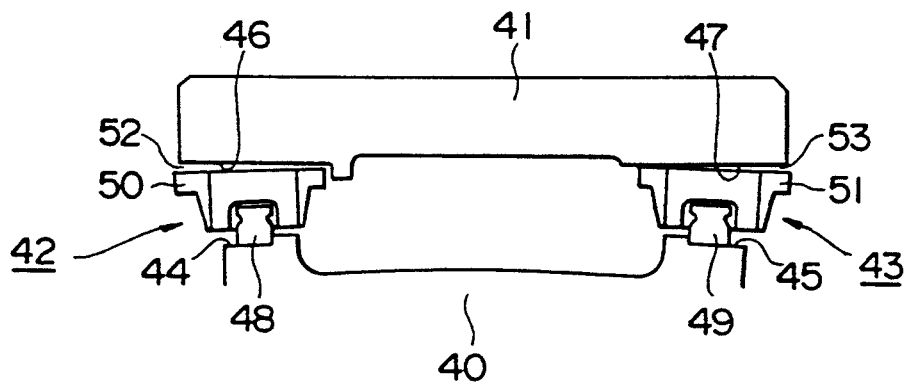
FIG. 14 is a schematic illustration showing in front view how the misalignment could occur in the prior art sliding table assembly when the base 40 has been deformed to present a generally convex top surface due to aging.

With this structure, even if a lower mounting surface 23 of the base is not in parallel with an upper mounting surface 24 of the table 7, such a misalignment can be conveniently absorbed by the misalignment absorbing plate 3 when the bolts 5 and 6 are appropriately tightened. Thus, the bolts 5 and the bolts 6 must be disposed spaced apart from each other in the lateral direction normal to the longitudinal axis of the assembly. Although it is preferable to arrange the bolts 5 and 6 on opposite sides of the rail 1, they may be arranged on the same side with respect to the rail 1, if necessary, because the bolts 5 and 6 are only required to be located spaced apart from each other in the lateral direction. In addition, although use has been made of balls as the rolling members in the above-described embodiment as indicated by the generally U-shaped guide grooves of the rail 1, use may also be made of rollers in place of balls. Moreover, although only one linear motion guide unit is shown to be provided between the base 9 and the table 7, two or more such linear motion guide units may be provided between the base 9 and the table 7 spaced apart from each other in the lateral direction in a manner similar to that shown in FIG. 13.

Figure 2:
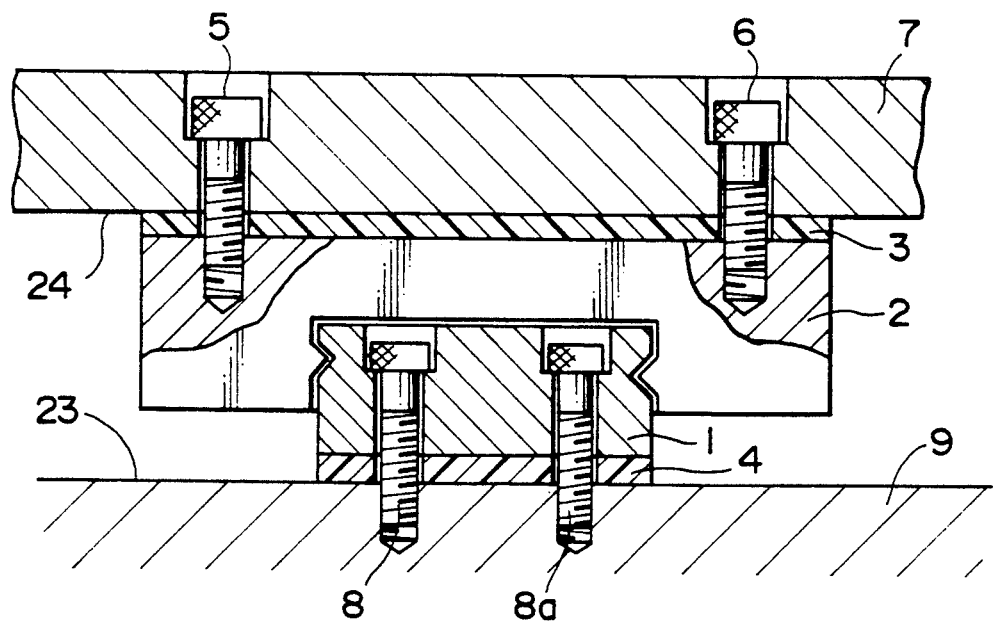
FIG. 2 is a schematic illustration showing partially in transverse cross section a linear motion guide unit assembly constructed in accordance with another embodiment of the present invention.

FIG. 2 illustrates another embodiment of the present invention which is similar in many respects to the first embodiment described above and shown in FIG. 1 so that like numerals indicate like elements. In this embodiment, another elastic or resilient plate 4 as a misalignment absorbing means is additionally provided between the rail 1 and the base 9 and two rows of bolts 8 and 8a are provided to have the rail 1 fixedly attached to the base 9. In this case also the two rows of bolts 8 and 8a are spaced apart from each other in the lateral direction normal to the longitudinal axis of the assembly.

In the embodiment shown in FIG. 2, use is made of rollers as the rolling members as indicated by the generally V-shaped guide grooves provided on the opposite side surfaces of the rail 1. As well known in the art, when the rollers are provided, they are arranged such that any two adjacent rollers have their rotating axes oriented perpendicular to each other when viewed into the direction of movement. However, use may also be made of balls in place of rollers in this embodiment.

FIGS. 3 through 7 illustrate a third embodiment of the present invention, which is somewhat different from the previous two embodiments. In the present embodiment, a rail 1 is directly and fixedly mounted on a mounting surface 23 of a base 9 and a slider sub-assembly 10 is slidably mounted on the rail 1 and fixedly attached to a table 7. In the present embodiment, use is made of rollers as rolling members since the rail 1 is provided with a pair of V-shaped guide grooves on the opposite side surfaces thereof. The slider sub-assembly 10 basically has a two-part structure, including a slider 12 and a pivotal member 11 as a misalignment absorbing means. The slider 12 has a generally U-shaped cross section and slidably mounted on the rail 1 in a straddling fashion. In one embodiment, the slider 12 is provided with a pair of endless circulating paths, each including a load path section, a return path section and a pair of curved connecting path sections connecting the corresponding ends of the load and return path sections.

Figure 5:
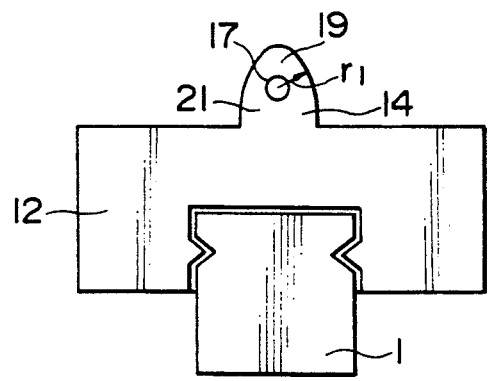
FIG. 5 is a schematic illustration showing in front view a combination between the rail and the slider employed in the assembly shown in FIG. 3.
Figure 6:
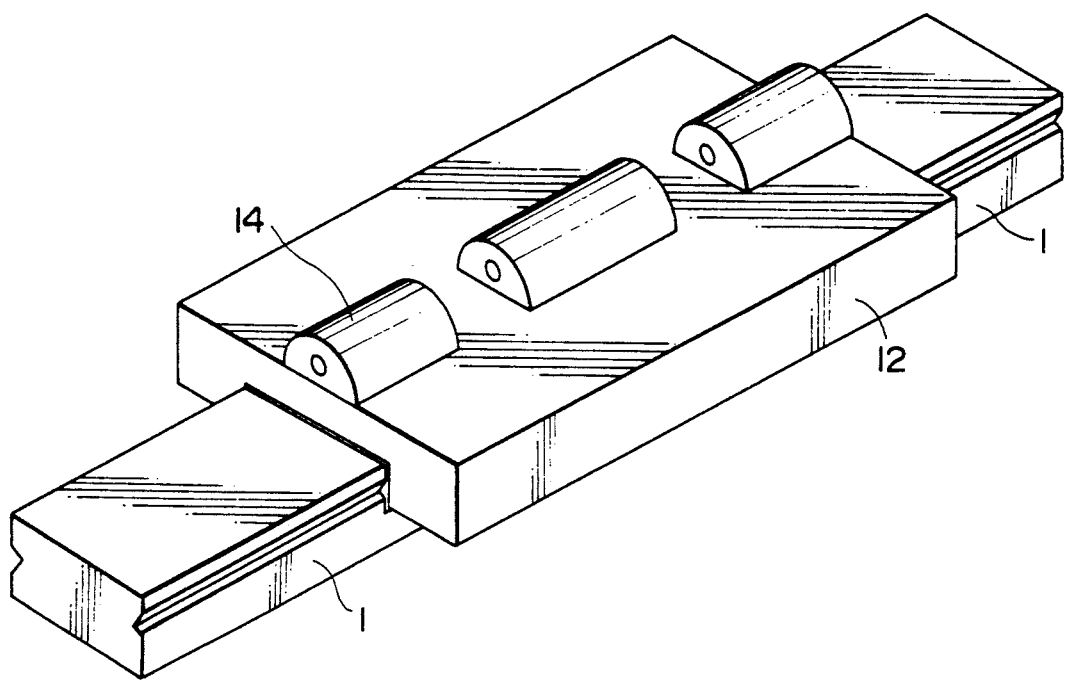
FIG. 6 is a schematic illustration showing in perspective view a combination between the slider and the rail in the assembly shown in FIG. 3.

As best shown in FIGS. 5 and 6, the slider 12 is provided with a supporting ridge 14 at the center of its top surface. In the illustrated embodiment, the supporting ridge 14 extends in parallel with the longitudinal axis of the assembly, but it is discontinued at two locations so that the supporting ridge 14 has three separate segments arranged in a line. The supporting ridge 14 includes a skirt section 21, which extends straight upward from the top surface of the slider 12, and a semi-cylindrical section 19 having a radius r1. Thus, the supporting ridge 14 has a rounded top surface 13 defined by the outer peripheral surface of the semi-cylindrical section 19. The supporting ridge 14 is also provided with a hole 17 which extends horizontally in parallel with the longitudinal axis of the assembly.

Figure 4:
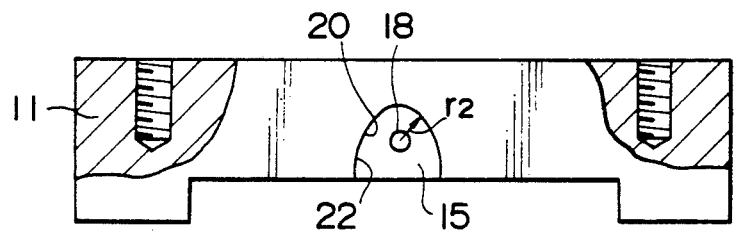
FIG. 4 is a schematic illustration showing partially in cross section the pivotal member employed in the assembly shown in FIG. 3.
Figure 7:
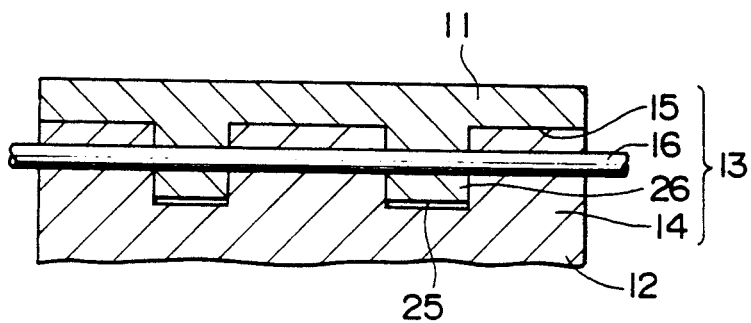
FIG. 7 is a schematic illustration showing in longitudinal cross section the pivotal connection between the slider and the pivotal member in the assembly shown in FIG. 3.

On the other hand, as best shown in FIG. 4, the pivotal member 11 is generally rectangular in shape and is formed with a series (three in the illustrated embodiment) of recesses 15, which are separate from each other and arranged in a line, at the center of its bottom. Each of the recesses 15 has a skirt section 22 at its bottom and a semi-cylindrical section 20 on top of the skirt section 22, which is defined by a radius r2. Each of these recesses 15 is so provided to receive therein a corresponding one of the segments of the supporting ridge 14. Since the three recesses 15 are formed arranged in a line, but separate from each other, so that a partition wall 26 is provided between any two adjacent recesses 15 as best shown in FIG. 7. And, each of the partition walls 16 is formed with a through hole 18 as shown in FIGS. 4 and 7. When assembled, the through hole 17 of the slider 12 is brought into alignment with the through hole 18 of the pivotal member 11 since an elongated pin 16 extends through these holes 17 and 18 when assembled. The pivotal member 11 is fixedly attached to the table 7 directly by means of bolts or the like.

In a preferred embodiment, the radii r1 and r2 are set at the same value, but the skirt section 22 of the pivotal member 11 is formed to flare out more than the skirt section 21 of the supporting ridge 14. It is to be noted, however, that the radii r1 and r2 may be set at different values, if desired.

Of importance, the slider 12 and the pivotal member 11 are so fabricated that a predetermined gap 25 be provided between the top surface of the slider 12 and at least that portion of the bottom surface of the pivotal member 11 which is opposite to the top surface of the slider 12. Because of the provision of such a gap 25, the pivotal member 11 is pivotal around the pin 16, which is supported by the supporting ridge 14 of the slider 14 of the slider 12, over a predetermined angle. This pivotal movement of the pivotal member 11 relative to the slider 12 allows to absorb any possible misalignment between the lower mounting surface of the base 9 and the upper mounting surface 24 of the table 7.

Figure 8:
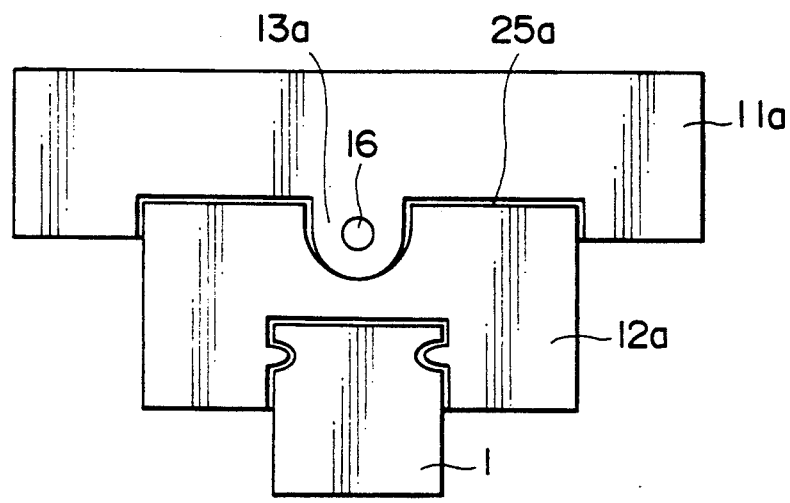
FIG. 8 is a schematic illustration showing in front view a linear motion guide unit assembly constructed in accordance with a still further embodiment of the present invention.
Figure 9:
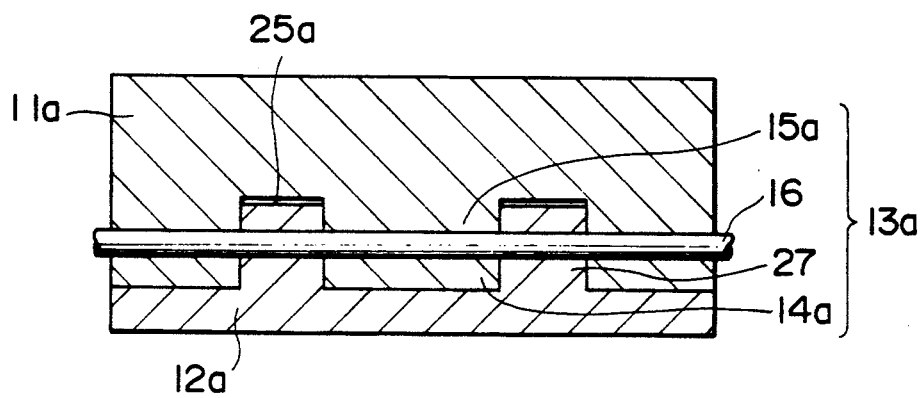
FIG. 9 is a schematic illustration showing in longitudinal cross section the pivotal connection between the slider and the pivotal member in the assembly shown in FIG. 8.

FIGS. 8 and 9 illustrate a fourth embodiment of the present invention, which is similar in many respects to the third embodiment just described above with reference to FIGS. 3 through 7. The present embodiment includes a slider 12a which is slidably mounted on the rail 1 similarly with the previously described third embodiment, but the slider 12a is formed with a series (three in the present embodiment) of recesses 15a arranged in a line spaced apart from each other at the center of its top surface in place of the supporting ridge 14 in the previous embodiment. Because of the provision of these recesses 14a, a partition wall 27 is provided between any two adjacent recesses 14a and the partition wall 27 is formed with a center hole.

In addition, the present embodiment includes a pivotal member 11a which is similar in many respects to the pivotal member 11 of the above-described third embodiment excepting the fact that a supporting ridge 14a is formed at the center of its bottom, projecting downwardly. The supporting ridge 14a is segmented into three portions, and each of the segments is received in a corresponding one of the recesses 15a. The supporting ridge 14a is also formed with a through hole in alignment with the through hole of the partition walls 27 so that a pin 16 extends through these holes. Thus, the pivotal member 11a is supported to be pivotal around the horizontally extending pin 16. Similarly with the previously described embodiment, the supporting ridge 14a has a skirt section which extends downwardly from the bottom of the pivotal member 11a and also a semi-cylindrical section continuous with the skirt section.

Figure 3:
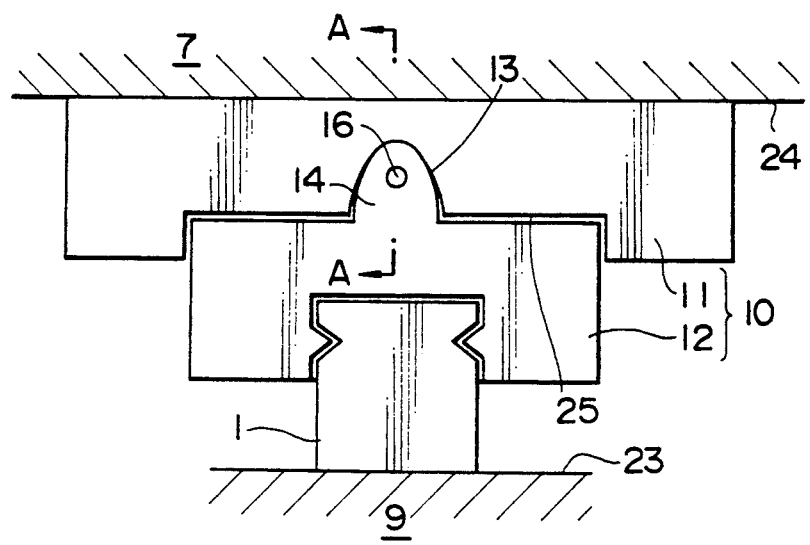
FIG. 3 is a schematic illustration showing in front view a linear motion guide unit assembly constructed in accordance with a further embodiment of the present invention.

Importantly, a predetermined gap 25a is provided between the top surface of the slider 12a and that portion of the bottom surface of the pivotal member 11a which is located opposite to the top surface of the slider 12a. With this structure, the pivotal member 11a may pivot around the pin 16 relative to the slider 12a until the pivotal member 11a comes into contact with the slider 12a over an angle determined by the gap 25a. Although not shown specifically, in this embodiment also, the rail 1 is fixedly attached to a base and the pivotal member 11a is fixedly attached to a table in a manner as shown in FIG. 3. In this event, even if there is a misalignment between the two opposed mounting surfaces of these base and the table, such an error in alignment can be conveniently absorbed by a pivotal movement of the pivotal member 11a relative to the slider 12a when assembled. In this case, such a correction of misalignment can be carried out automatically and no extra step is required.

Figure 10:
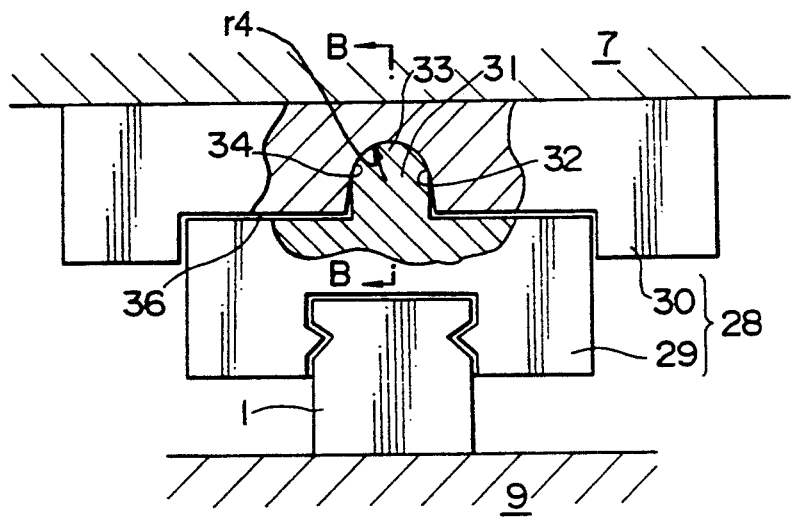
FIG. 10 is a schematic illustration showing in front view partly in cross section a linear motion guide unit assembly constructed in accordance with a still another embodiment of the present invention.
Figure 11:
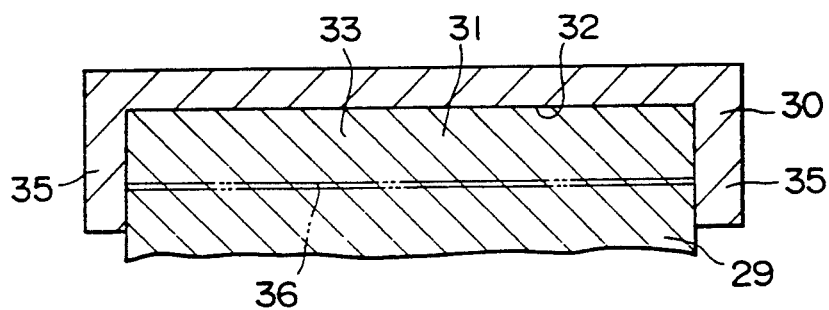
FIG. 11 is a schematic illustration showing a cross section taken along line B—B indicated in FIG. 10.
Figure 12:
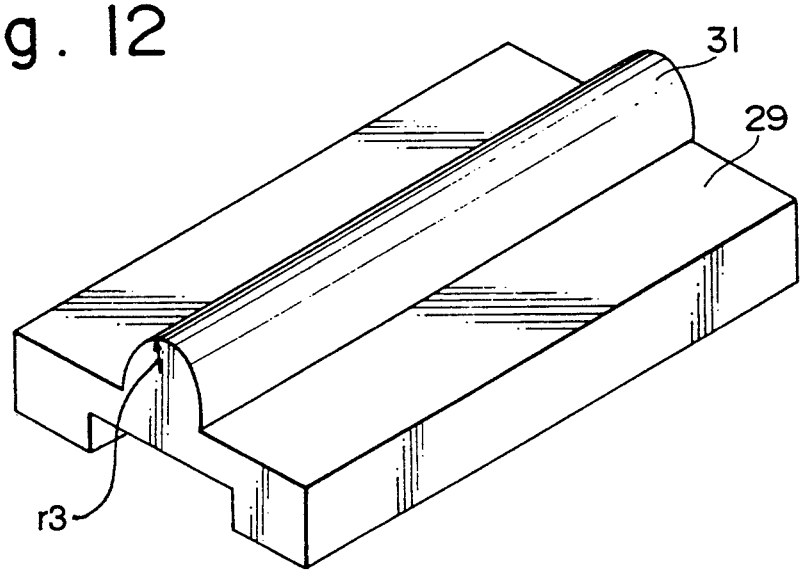
FIG. 12 is a schematic illustration showing in perspective view the slider employed in the assembly shown in FIG. 10.

FIGS. 10 through 12 illustrate a fifth embodiment of the present invention. The present embodiment includes a rail 1, which is fixedly attached to a base 9, and a slider sub-assembly 28, which is slidably mounted on the rail 1 and fixedly attached to a table 7. Similarly with the last two embodiments described above, the slider sub-assembly 28 has a two part structure, including a slider 29 and a pivotal member 30. The slider 29 is generally U-shaped cross section and thus slidably mounted on the rail 1 in a straddling manner. In the present embodiment, the rail 1 is provided with a pair of inner guide grooves on its opposite side surfaces, and the slider 29 is also provided with a pair of outer guide grooves each located opposite to a corresponding one of the inner guide grooves as well known in the art to thereby define a guide channel or load path section of an endless circulating path. A plurality of rolling members, or rollers in the illustrated embodiment, are provided in the guide channels to provide a rolling contact between the rail 1 and the slider 29.

In the present embodiment, the slider 29 is provided with a supporting ridge 31 at the center of its top surface projecting upwardly as best shown in FIG. 12. The supporting ridge 31 has a rounded top section 33 having a rounded top surface, preferably defined by the outer peripheral surface of a semi-cylinder having a predetermined radius r3. On the other hand, the pivotal member 30 is formed with a recess 32, which is large enough to receive therein the supporting ridge 31 of the slider 29 and which has a rounded top section 34, preferably defined by the outer peripheral surface of a semi-cylinder having a predetermined radius r4. These radii r3 and r4 may be set at the same value in a preferred embodiment, but they may be set at different values, if desired. However, it is important that the supporting ridge 31 and the receiving recess 32 are so structured that the pivotal member 30 may pivot relative to the slider 29 with the supporting ridge 31 kept received in the recess 32. For this purpose, the receiving recess 32 is preferably provided with a flared out skirt section at its bottom.

As best shown in FIG. 11, the recess 32 is so formed that an end wall 35 is provided at the front and rear ends so that the supporting ridge 31 when received in the recess 32 does not slip away in the longitudinal direction. Importantly, a predetermined gap 36 is provided between the top surface of the slider 29 and that portion of the bottom surface of the pivotal member 30 which is located opposite to the top surface of the slider 29 when assembled. With the provision of such a gap, the pivotal member 30 may pivot relative to the slider 29 over an angle determined by the gap 36.

With this structure, since the pivotal member 30 may pivot relative to the slider 29 over a predetermined angle, even if there is an error in alignment between the opposed mounting surfaces of the base 9 and the table 7, such an alignment error can be automatically and completely absorbed by the pivotal movement of the pivotal member 30 relative to the slider 20 when assembled.

As a modification of the embodiment just described above, the slider 29 may be so fabricated to include a recess and the pivotal member 30 may be so fabricated to include a supporting ridge to be pivotally received in the recess of the slider 29. Such a modified structure is as effective and advantageous in eliminating an alignment error as the embodiment just described above.

In the above-described embodiments, the misalignment absorbing means is provided to absorb an alignment error in the direction perpendicular to the longitudinal axis of the assembly. However, it should be noted that the principle of the present invention is equally applicable to eliminate an alignment error in the longitudinal axis. For example, if it is desired to eliminate such an alignment error both in the longitudinal axis and a lateral direction perpendicular to the longitudinal axis, then the principle of the present invention may be applied at two levels. That is, in the embodiment shown in FIG. 10, a similar misalignment absorbing mechanism may be provided between the pivotal member 30 and the table 7 with a supporting ridge extending in the lateral direction perpendicular to the longitudinal axis of the rail 1.

While the above provides a full and complete disclosure of the present invention, various modifications. alternate constructions and equivalents may be made without departing from the true spirit and scope of the present invention which is defined by the appended claims.

What is claimed is:

1. A linear motion guide unit assembly comprising:
   a linear motion guide unit including a rail, a slider slidably mounted on said rail and having a generally U-shaped cross section and a plurality of rolling members interposed between said rail and said slider;
   a first member having a first mounting surface to which said rail is fixedly attached;
   a second member having a second mounting surface to which said slider is fixedly attached;
   means interposed at at least one interface of interfaces between said first mounting surface and said rail and between said second mounting surface and said slider, for absorbing a misalignment between said first and second mounting surfaces in a direction transverse to a longitudinal direction of said rail when assembled, said misalignment absorbing means including a deformable elastic plate; and
   at least two fixing means spaced apart from each other in a direction transverse to a longitudinal axis of said assembly for fixing two elements sandwiching said misalignment absorbing means.

2. The assembly of claim 1, wherein each of said at least two fixing means includes a bolt.

3. The assembly of claim 1, wherein said elastic plate absorbs an error in parallelism between said first and second mounting surfaces when assembled.

4. The assembly of claim 1, wherein said rolling members are rollers.

5. The assembly of claim 1, wherein said rolling members are balls.

6. A linear motion guide unit assembly, comprising:
- a linear motion guide unit including a rail, a slider slidably mounted on said rail and having a generally U-shaped cross section and a plurality of rolling members interposed between said rail and said slider;
- a first member having a first mounting surface to which said rail is fixedly attached;
- a second member having a second mounting surface to which said slider is fixedly attached; and
- means interposed at at least one interface of interfaces between said first mounting surface and said rail and between said second mounting surface and said slider, for absorbing a misalignment between said first and second mounting surfaces, wherein said misalignment absorbing means includes a pivotal member which is supported to be pivotal so as to absorb a misalignment between said first and second mounting surfaces when assembled, said pivotal member including a ridge and a recess for receiving therein said ridge to provide a pivotal movement around a longitudinal axis in parallel with a longitudinal axis of said assembly.

7. The assembly of claim 6, further comprising a pin which is supported in position by said slider, and wherein said pivotal member is supported to be pivotal around said pin so as to absorb an error in alignment between said first and second mounting surfaces when assembled.

8. The assembly of claim 6, wherein said pivotal member is formed with at least one recess having a first particular shape at its bottom surface and said slider is formed with a ridge having a second particular shape at its top surface so as to be received in said recess, and wherein a predetermined gap is provided between the bottom surface of said pivotal member and the top surface of said slider such that said pivotal member may pivot with respect to said slider over a predetermined angle.

9. The assembly of claim 8, wherein said pivotal member is pivotally coupled to said slider through a pin.

10. The assembly of claim 6, wherein said slider is formed with at least one recess having a first particular shape at its top surface and said pivotal member is formed with a ridge having a second shape at its bottom surface so as to be received in said recess, and wherein a predetermined gap is provided between the bottom surface of said pivotal member and the top surface of said slider such that said pivotal member may pivot with respect to said slider over a predetermined angle.

11. The assembly of claim 10, wherein said pivotal member is pivotally coupled to said slider through a pin.

12. A linear motion guide unit assembly, comprising:
- a linear motion guide unit including a rail, a slider slidably mounted on said rail and having a generally U-shaped cross section and a plurality of rolling members interposed between said rail and said slider;
- a first member having a first mounting surface to which said rail is fixedly attached;
- a second member having a second mounting surface to which said slider is fixedly attached;
- means interposed at at least one interface of interfaces between said first mounting surface and said rail and between said second mounting surface and said slider, for absorbing a misalignment between said first and second mounting surfaces;
- wherein said misalignment absorbing means includes a pivotal member which is supported to be pivotal so as to absorb a misalignment between said first and second mounting surfaces when assembled;
- wherein said pivotal member is formed with at least one recess having a first particular shape at its bottom surface and said slider is formed with a ridge having a second particular shape at its top surface so as to be received in said recess, and wherein a predetermined gap is provided between the bottom surface of said pivotal member and the top surface of said slider such that said pivot member may pivot with respect to said slider over a predetermined angle; and
- wherein said pivotal member is pivotally coupled to said slider through a pin.

13. A linear motion guide unit assembly, comprising:
- a linear motion guide unit including a rail, a slider slidably mounted on said rail and having a generally U-shaped cross section and a plurality of rolling members interposed between said rail and said slider;
- a first member having a first mounting surface to which said rail is fixedly attached;
- a second member having a second mounting surface to which said slider is fixedly attached; and
- means interposed at at least one interface of interfaces between said first mounting surface and said rail and between said second mounting surface and said slider, for absorbing a misalignment between said first and second mounting surfaces when assembled;
- wherein said misalignment means absorbing means includes a pivotal member which is supported to be pivotal so as to absorb a misalignment between said first and second mounting surfaces when assembled; and
- wherein said slider is formed with at least one recess having a first particular shape at its top surface and said pivotal member is formed with a ridge having a second shape at its bottom surface so as to be received in said recess, and wherein a predetermined gap is provided between the bottom surface of said pivotal member and the top surface of said slider such that said pivotal member may pivot with respect to said slider over a predetermined angle.

14. The assembly of claim 13, wherein said pivotal member is pivotal member is pivotally coupled to said slider through a pin.